United States Patent [19]
Johnson

[11] 3,770,077
[45] Nov. 6, 1973

[54] VEHICLE SUSPENSION SYSTEM
[75] Inventor: William S. Johnson, Madison Heights, Mich.
[73] Assignee: General Motors Corporation, Detroit, Mich.
[22] Filed: July 21, 1972
[21] Appl. No.: 274,074

[52] U.S. Cl. .................. 180/71, 180/75, 267/140
[51] Int. Cl. ............................................ B60g 7/04
[58] Field of Search .................. 248/358; 180/70 P, 180/71, 73; 267/140, 141; 280/104.5 R

[56] References Cited
UNITED STATES PATENTS

| | | | |
|---|---|---|---|
| 3,149,689 | 9/1964 | Adloff | 180/73 R X |
| 2,417,214 | 3/1947 | Roos | 180/73 D |
| 3,155,186 | 11/1964 | Cadmus | 180/73 C X |
| 3,057,641 | 10/1962 | Jewell | 280/104.5 R |
| 2,713,498 | 7/1955 | Brown | 280/104.5 R |

FOREIGN PATENTS OR APPLICATIONS

| | | | |
|---|---|---|---|
| 510,137 | 7/1939 | Great Britain | 180/70 P |
| 204,809 | 11/1956 | Australia | 180/70 P |

Primary Examiner—Kenneth H. Betts
Assistant Examiner—Terrance L. Siemens
Attorney—Warren E. Finken et al.

[57] ABSTRACT

An improved automobile rear suspension system of the type including an axle carrier assembly having a pinion carrier portion, a pair of coil springs disposed between the carrier assembly and the sprung mass portion of the vehicle, and a plurality of control arms for controlling the orbit of the carrier assembly during jounce and rebound deflection of the latter, the improvement residing in the provision of a cushion bumper assembly disposed on the sprung mass portion and including a pair of bumper members, and a pair of abutments on the pinion carrier portion. Each of the abutments is engageable exclusively on a corresponding one of the bumper members to limit jounce deflection, one of the bumper members being operative only when the axle assembly experiences jounce deflection in a "wind-up" configuration and other bumper members being operative at all other times so that all available clearance space is utilized for maximizing permissible jounce deflection.

3 Claims, 5 Drawing Figures

PATENTED NOV 6 1973 3,770,077

VEHICLE SUSPENSION SYSTEM

This invention relates generally to vehicle suspension systems and more particularly to an arrangement for limiting the jounce deflection of an axle carrier portion of the suspension system.

A typical rear suspension system for an automobile type vehicle includes an axle carrier assembly representing a portion of the unsprung mass of the vehicle, a pair of transversely spaced coil springs disposed between the carrier assembly and the sprung mass portion of the vehicle, and a plurality of control arms for controlling the orbit of the carrier assembly relative to the sprung mass portion during relative jounce and rebound deflections. The carrier assembly typically includes a differential pinion carrier portion which projects forwardly relative to the sprung mass portion and which rotatably supports a pinion shaft, the pinion shaft being connected to a longitudinally extending drive shaft and supporting a pinion gear which drives the rear wheels of the vehicle through differential gearing and a pair of axle shafts rotatably supported within the axle carrier assembly.

During jounce and rebound deflection of the carrier assembly, the drive shaft moves generally vertically through substantially the same distance traversed by the forward end or nose of the pinion carrier portion, the travel of the nose typically being limited in jounce by a single cushion bumper disposed on the sprung mass portion. Concurrently, the control arm bushings permit limited angular displacement of the axle carrier assembly relative to the sprung mass portion generaly about an axis defined by the axle shafts. More particularly, under conditions of hard acceleration, the nose of the pinion carrier portion moves upwardly or "winds-up" under the influence of acceleration torque on the axle carrier assembly. When jounce deflection occurs under this condition and the bumper is struck, the minimum vehicle floor height above the drive shaft is established since the drive shaft is then at its maximum height. Conversely, if the clearance between the vehicle floor and the drive shaft is independently established, the location of the bumper is subsequently determined with the axle carrier assembly in the "wind-up" condition.

There is, however, a second mode of axle carrier angular displacement, commonly referred to as "wind-down," which occurs when jounce deflection takes place without the vehicle undergoing hard acceleration. In this condition, the nose of the pinion carrier portion engages the bumper while the remainder of the axle carrier assembly continues to move upwardly until cushions on the frame rails are engaged. Hence, the axle carrier assembly is twisted or angularly displaced in the opposite direction. Because the same bumper functions in both "wind-up" and "wind-down" modes there may be excessive floor clearance above the drive shaft during "wind-down." Thus, the jounce deflection is unduly limited. A suspension system according to this invention represents an improvement over heretofore known systems in that it incorporates a cushion bumper assembly which functions to maximize available jounce deflection for the axle carrier assembly by utilizing all available clearance between the drive shaft and the floor in both "wind-up" and "wind-down" displacement modes.

Accordingly, the primary feature of this invention is that it provides an improved vehicle suspension system and, more particularly, an improved rear suspension system for an automobile. Another feature of this invention resides in the provision in the suspension system of a new cushion bumper assembly which permits maximum utilization of available clearance above the drive shaft for maximizing jounce deflection of the axle carrier assembly in both the "wind-up" and "wind-down" displacement modes. Yet another feature of this invention resides in the provision of a cushion bumper assembly which functions in either of two modes to limit movement of the nose of the pinion carrier portion, one mode limiting jounce deflection in the axle carrier "wind-up" condition and the other mode limiting jounce deflection in the axle carrier "wind-down" condition. A still further feature of this invention resides in the provision of a cushion bumper assembly including a first bumper operative only and exclusively during jounce deflection under axle carrier "wind-up" conditions and a second bumper operative only and exclusively during jounce deflection under axle carrier "wind-down" conditions.

These and other features of this invention will be readily apparent from the following specification and from the drawings wherein.

Figure 1:
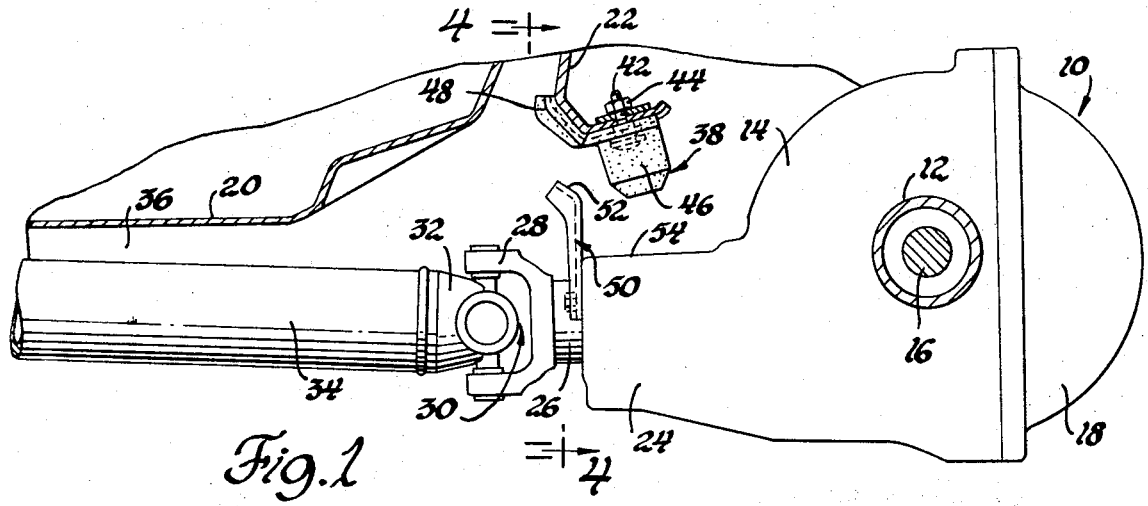
FIG. 1 is a fragmentary side elevational view partially in section of an automobile rear suspension system according to this invention.
Figure 4:
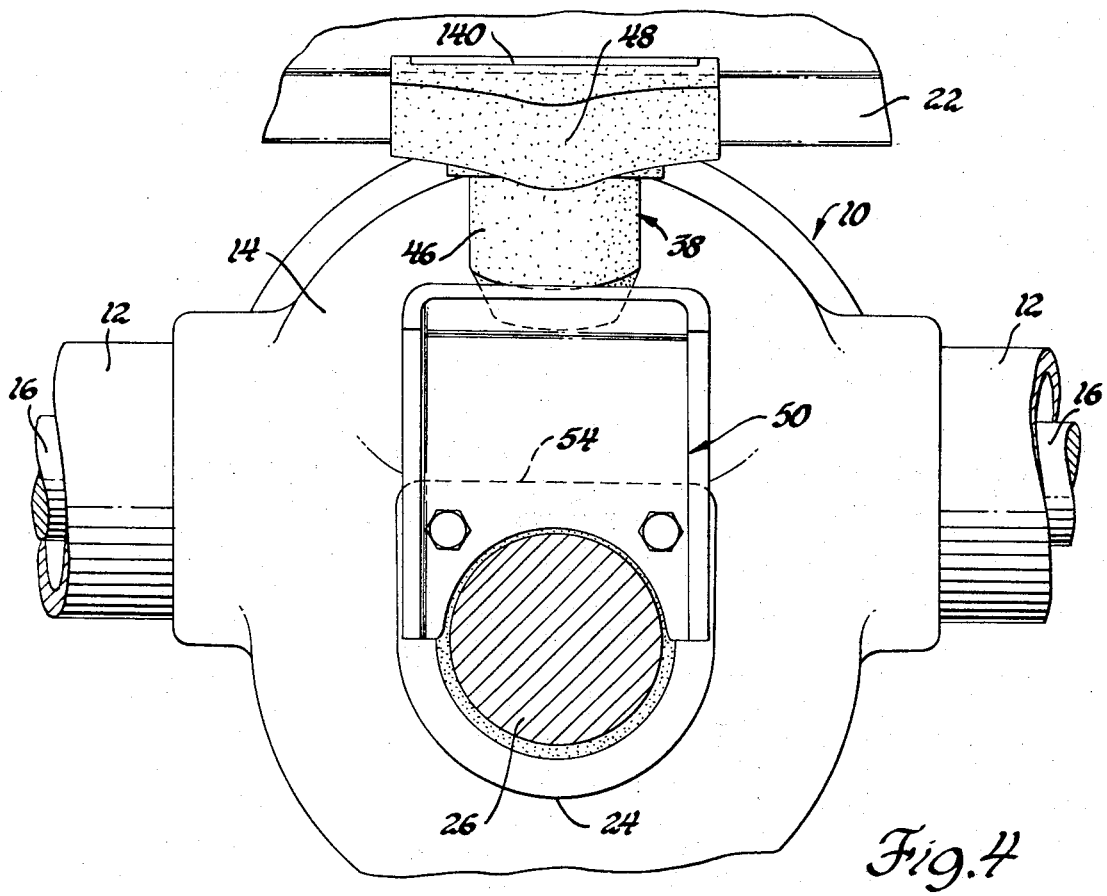
FIG. 4 is an enlarged sectional view taken generally along the plane indicated by lines 4—4 in FIG. 1.

Referring now to FIGS. 1 and 4 of the drawings, there is shown a portion of the rear suspension system for an automobile type vehicle, the system including a conventional axle carrier assembly designated generally 10. The carrier assembly 10 extends transversely across the vehicle and includes a pair of tubes 12 projecting rigidly and in opposite directions from a centrally located, enlarged pinion carrier portion 14. Each tube 12 rotatably supports therewithin through conventional bearing means, not shown, one of a pair of axle shafts 16 which are drivingly connected at their outboard ends to the rear road wheels, not shown, of the vehicle. The axle shafts 16 are driven in a conventional manner through differential gearing housed within the pinion carrier portion 14 of the carrier assembly 10, the rear side of the pinion carrier portion being sealingly closed by cover 18.

The axle carrier assembly 10 represents a portion of the unsprung mass of the vehicle and the body and frame combination represents the sprung mass portion of the vehicle. The body includes a rigid floor structure 20 and a rigid bumper bracket 22, the bracket 22 being disposed generally above the pinion carrier portion 14. The sprung mass portion is resiliently suspended above the axle carrier assembly 10 by a pair of transversely spaced coil springs, not shown, each seating at one end on a corresponding one of the tubes 12 and at the other end on the sprung mass portion. The axle carrier assembly is thereby adapted for jounce and rebound deflection relative to the sprung mass portion, the orbit of the carrier assembly relative to the sprung mass portion being defined by a plurality of control arms, not shown, disposed between the sprung mass portion and the carrier assembly in a conventional manner. As more fully described hereinafter, the axle carrier assembly 10 is further adapted for limited angular displacement relative to the sprung mass portion generally about a transverse axis defined by the axle shafts 16.

Referring again to FIGS. 1 and 4, the pinion carrier portion 14 includes an integral, elongated nose section 24 within which is rotatably journaled a pinion shaft 26. Internally of the carrier portion 14, the shaft 26 has rigidly attached thereto a drive pinion, not shown, which meshingly engages a conventional differential ring gear for effecting rotation of both axle shafts in response to rotation of the pinion shaft 26. Externally of the carrier portion 14, the pinion shaft 26 has rigidly attached thereto a yoke 28 which journals two opposite trunnions of a universal joint spider 30, the other two trunnions of the spider being journaled in a yoke 32 rigidly attached to the rearward end of a drive shaft 34. The drive shaft 34 extends longitudinally of the vehicle between the power transmission thereof, not shown, and the pinion shaft 26. As is conventional, the floor structure 20 has a longitudinally extending raised portion therein, commonly referred to as a tunnel, through which extends the drive shaft 34. When the vehicle body is statically loaded to its design limit, a design clearance designated generally 36, FIG. 1, exists between the drive shaft 34 and the top of the tunnel in the floor structure.

Figure 2:
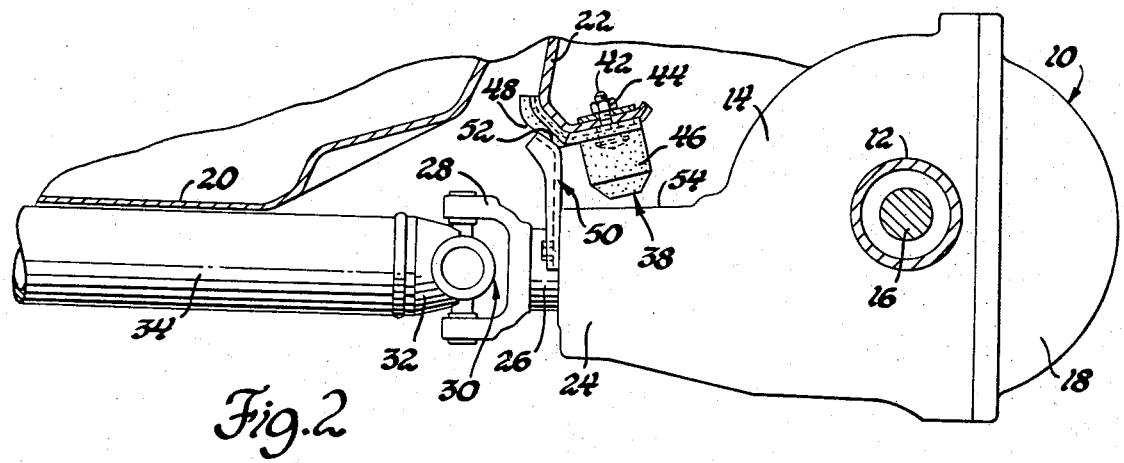
FIG. 2 is similar to FIG. 1 and showing the axle carrier assembly in the "wind-up" condition.
Figure 3:
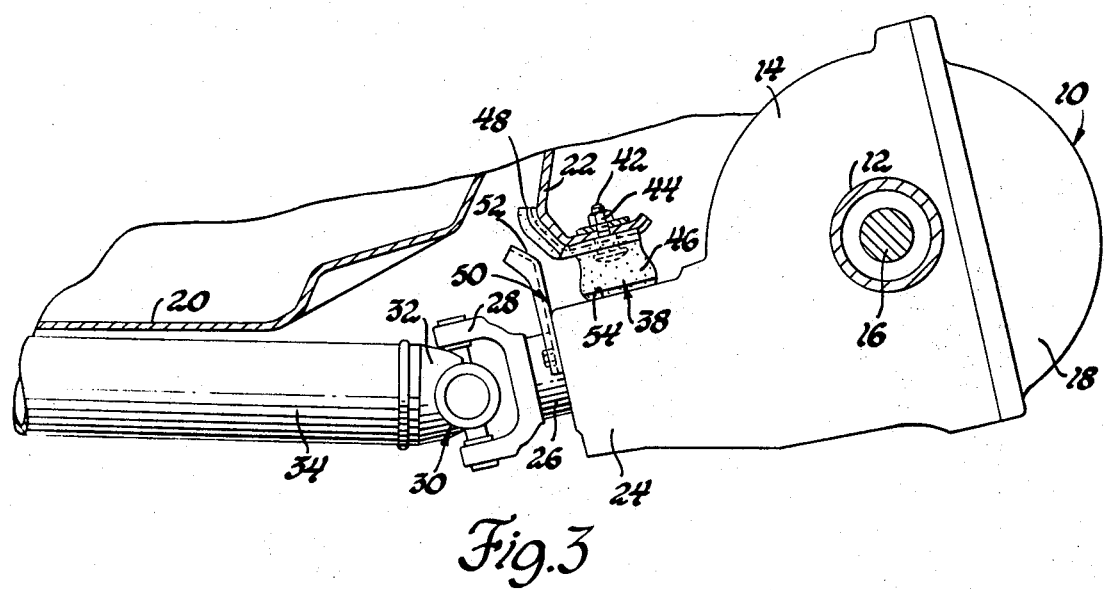
FIG. 3 is similar to FIG. 2 but showing the axle carrier assembly in the "wind-down" condition.

As seen best in FIGS. 1, 2 and 3, from the static design condition illustrated in FIG. 1, the axle carrier assembly is adapted for vertical jounce deflection toward the sprung mass portion of the vehicle and also for limited angular displacement. More particularly, when torque of substantial magnitude is applied to the pinion shaft 26 through the yoke 28, as might occur during periods of rapid or hard acceleration, the nose 24 of the carrier portion 14 is urged upwardly toward the bracket 22, this condition being referred to hereinafter as the "wind-up" condition. Similarly, when a downwardly directed force is exerted on the nose 24 of the pinion carrier portion 14, the latter is urged downward to effect angular displacement of the axle carrier assembly in the direction opposite to the "wind-up" direction, this condition being referred to hereinafter as the "wind-down" condition. The angular displacement of the axle carrier assembly in either mode is, of course, accompanied by deformation of the conventional resilient bushings disposed between the control arms, the carrier assembly, and the sprung mass portion.

Figure 5:
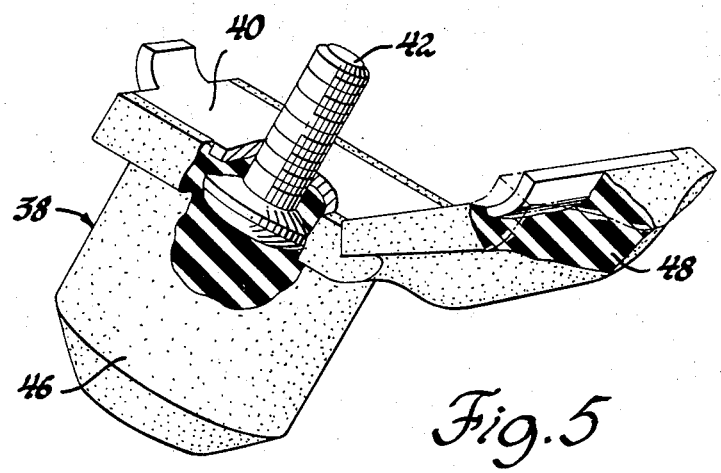
FIG. 5 is an enlarged perspective view of the cushion bumper assembly.

As best seen in FIGS. 1, 4 and 5, a cushion bumper assembly designated generally 38 is provided for limiting jounce deflection of the nose 24 of the pinion carrier portion. More particularly, the bumper assembly 38 includes a reinforcing plate 40 in which is anchored a threaded stud 42. The curvature of the reinforcing plate is generally complementary to the curvature of the bracket 22 thereby to facilitate attachment of the reinforcing plate to the bracket, the plate being maintained on the bracket by a nut 44 threadedly received on the stud behind the bracket, FIG. 1. The reinforcing plate has securely attached thereto a pair of independent cushion bumpers including an enlarged first bumper 46 and a somewhat smaller second bumper 48. On the bracket 22, the second bumper is disposed forwardly of the first bumper relative to the sprung mass portion of the vehicle. The bumpers are fabricated from any conventional resilient material such as hard rubber or the like.

Cooperating with the cushion bumper assembly 38 are a pair of abutments on the nose 24 of the pinion carrier portion 14. A first abutment is defined by a collar 50 rigidly attached to the forward end of the nose 24, the collar 50 including a bearing surface 52 disposed generally below the second bumper 48. A second abutment rigidly attached to the nose 24 is defined by a top surface portion 54 of the nose, the surface portion 54 being disposed generally below the first bumper 46.

Describing now the dynamic operation of the suspension system according to this invention, when the vehicle is proceeding under relatively slight acceleration or in a coasting or decelerating manner and an obstruction is encountered in the roadway jounce deflection of the axle carrier assembly 10 is initiated. Since the forward end of the nose 24 of the pinion carrier portion 14 is closest to the rearward end of the drive shaft 34, the drive shaft tends to move vertically through the same distance traversed by the forward end of the nose. In the absence of acceleration torque on the axle carrier assembly, as the drive shaft approaches the top of the tunnel, the surface portion 54 engages the first bumper 46, the latter cushioningly arresting vertical movement of the nose 24. The rearward section of the pinion carrier portion 14 and the remainder of the axle carrier assembly, however, continue upwardly until bumpers, not shown, on the sprung mass portion engage the tubes 12 to fully arrest jounce deflection of the axle carrier assembly. Under these conditions, the first bumper 46 exerts a downward force on the nose 24 thereby angularly displacing the axle carrier in the "wind-down" mode. In effecting "wind-down" of the axle carrier assembly the first bumper 46 functions to the complete exclusion of the second bumper 48, FIG. 3, the bearing surface 52 lying remote from the second bumper 48.

Referring now to FIGS. 1 and 2, when the acceleration torque generated by hard acceleration is applied to the axle carrier assembly, the forward end of the nose 24 and, of course, the collar 50 move slightly upward. If during this hard acceleration an obstruction in the road is encountered, jounce deflection of the axle carrier assembly is initiated. Accordingly, nose 24 and the drive shaft move vertically upward until the bearing surface 52 engages the second bumper 48, the second bumper thereupon cushioningly arresting vertical movement of the nose 24. The acceleration torque experienced by the axle carrier assembly counteracts the tendency of the carrier assembly to go into the "wind-down" configuration so that the pinion carrier portion 14 and the drive shaft 34 assume the relative positions shown in FIG. 2. During jounce of the axle carrier assembly in the "wind-up" condition, the second bumper functions to the exclusion of the first bumper 46 with the surface portion 54 being remote from the first bumper.

It will be apparent to those skilled in the art that the locations of the bumpers and the abutments are interchangeable. More particularly, the cushion bumper assembly 38 might be fabricated as two separate units as opposed to the unitary construction illustrated. Further, the cushion bumpers might be located on or attached to the nose 24 of the pinion carrier portion 14 with the abutments being disposed on the bracket 22.

Having thus described the invention, what is claimed is:

1. In a vehicle suspension system including an axle carrier assembly adapted for jounce and rebound deflection relative to a sprung mass portion of said vehicle and for limited angular displacement relative to said sprung mass portion in a wind-up mode under the influence of a torsional moment in one direction and in a wind-down mode under the influence of a torsional moment in the opposite direction, the improvement comprising, a first abutment rigidly attached to one of said axle carrier and said sprung mass portion, a first cushion bumper rigidly attached to the other of said axle carrier and said sprung mass portion, said first abutment in the absence of angular displacement of said axle carrier in said wind-up mode being engageable exclusively on said first cushion bumper during jounce deflection of said axle carrier thereby to cushioningly limit said jounce deflection while exerting on said axle carrier a torsional moment effecting angular displacement thereof in said wind-down mode, a second abutment rigidly attached to one of said axle carrier and said sprung mass portion, and a second cushion bumper rigidly attached to the other of said axle carrier and said sprung mass portion, said second abutment in the presence of substantial angular displacement of said axle carrier in said wind-up mode being engageable exclusively on said second cushion bumper during jounce deflection of said axle carrier thereby to cushioningly limit said jounce deflection.

2. In a vehicle suspension system including an axle carrier assembly adapted for jounce and rebound deflection relative to a sprung mass portion of said vehicle and for limited angular displacement relative to said sprung mass portion in a wind-up mode under the influence of a torsional moment in one direction and in a wind-down mode under the influence of a torsional moment in the opposite direction, said axle carrier assembly including a differential pinion carrier portion projecting rigidly therefrom, the improvement comprising, a first abutment rigidly attached to one of said sprung mass portion and said pinion carrier portion, a first cushion bumper rigidly attached to the other of said sprung mass portion and said pinion carrier portion, said first abutment in the absence of angular displacement of said axle carrier in said wind-up mode being engageable exclusively on said first cushion bumper during jounce deflection of said axle carrier thereby to cushioningly limit said jounce deflection of said pinion carrier portion while exerting on said axle carrier a torsional moment effecting angular displacement thereof in said wind-down mode, a second abutment rigidly attached to one of said sprung mass portion and said pinion carrier portion, and a second cushion bumper rigidly attached to the other of said sprung mass portion and said pinion carrier portion, said second abutment in the presence of substantial angular displacement of said axle carrier in said wind-up mode being engageable exclusively on said second cushion bumper during jounce deflection of said axle carrier thereby to cushioningly limit said jounce deflection.

3. In a vehicle suspension system including an axle carrier assembly adapted for jounce and rebound deflection relative to a sprung mass portion of said vehicle and for limited angular displacement relative to said sprung mass portion in a wind-up mode under the influence of a torsional moment in one direction and in a wind-down mode under the influence of a torsional moment in the opposite direction, said axle carrier assembly including a differential pinion carrier portion projecting rigidly therefrom and forwardly with respect to said sprung mass portion, the improvement comprising, means on said pinion carrier portion defining a first rigid abutment spaced rearwardly of the distal end of said pinion carrier portion, a second abutment rigidly attached to said pinion carrier portion generally at the distal end thereof, a unitary cushion bumper assembly including a first bumper portion and a second bumper portion, and means rigidly attaching said cushion bumper assembly to said sprung mass portion generally above said pinion carrier portion, said first abutment in the absence of angular displacement of said axle carrier in said wind-up mode being engageable exclusively on said first cushion bumper during jounce deflection of said axle carrier thereby to cushioningly limit said jounce deflection of said pinion carrier portion while exerting on said axle carrier a torsional moment effecting angular displacement thereof in said wind-down mode and said second abutment in the presence of substantial angular displacement of said axle carrier in said wind-up mode being engageable exclusively on said second cushion bumper during jounce deflection of said axle carrier thereby to cushioningly limit said jounce deflection.

* * * * *